(12) United States Patent
Wan et al.

(10) Patent No.: US 11,127,373 B2
(45) Date of Patent: Sep. 21, 2021

(54) AUGMENTED REALITY WEARABLE SYSTEM FOR VEHICLE OCCUPANTS

(71) Applicant: Ford Global Technologies, LLC, Dearborn, MI (US)

(72) Inventors: Jian Wan, Novi, MI (US); Prayat Anil Hedge, Dearborn, MI (US); Jeffrey Allen Greenberg, Ann Arbor, MI (US); Kwaku Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 16/668,560

(22) Filed: Oct. 30, 2019

(65) Prior Publication Data

US 2021/0134248 A1    May 6, 2021

(51) Int. Cl.
*G09G 5/12* (2006.01)
*G06T 11/00* (2006.01)
(Continued)

(52) U.S. Cl.
CPC .......... *G09G 5/12* (2013.01); *G01S 19/51* (2013.01); *G06K 9/00281* (2013.01);
(Continued)

(58) Field of Classification Search
CPC .. G09G 5/12; G09G 2354/00; G09G 2380/10; G01S 19/51; G06K 9/00281;
(Continued)

(56) References Cited

U.S. PATENT DOCUMENTS

| 2014/0098008 | A1  | 4/2014 | Hatton |  |
|---|---|---|---|---|
| 2017/0089710 | A1* | 3/2017 | Slusar | G01C 21/3602 |

(Continued)

FOREIGN PATENT DOCUMENTS

| CN | 207164368 U2 | 8/2017 |
| DE | 102014009608 A1 | 6/2014 |

OTHER PUBLICATIONS

Hobson, Benedict, "MINI's augmented-reality glasses allow drivers to see through the body of their car," Dezeen and Mini Frontiers, Apr. 24, 2015 (14 pages).

*Primary Examiner* — Michelle L Sams
(74) *Attorney, Agent, or Firm* — Brandon Hicks; Eversheds Sutherland (US) LLP

(57) ABSTRACT

A method includes determining a location of a roadside object relative to a vehicle interior based on one or more of a vehicle Global Positioning System (GPS) location, a vehicle heading, and environmental data, and generating a first virtual representation of the roadside object in an augmented reality (AR) world coordinate system. A processor synchronizes a vehicle coordinate system with the AR world coordinate system, in which a virtual representation of the roadside object is generated. The method further includes orienting a driver AR wearable device with the synchronized vehicle coordinate system, determining an identity associated with a user of the driver AR wearable device, and generating, based at least in part on the identity associated with the user of the driver AR wearable device, a virtual representation of the roadside object in an AR world coordinate system aligned with the vehicle GPS location and the vehicle heading.

16 Claims, 4 Drawing Sheets

(51) Int. Cl.
*G06K 9/00* (2006.01)
*G01S 19/51* (2010.01)
*H04W 4/44* (2018.01)

(52) U.S. Cl.
CPC .......... *G06K 9/00288* (2013.01); *G06T 11/00* (2013.01); *G09G 2354/00* (2013.01); *G09G 2380/10* (2013.01); *H04W 4/44* (2018.02)

(58) Field of Classification Search
CPC ... G06K 9/00288; G06T 11/00; G06T 19/006; H04W 4/44
See application file for complete search history.

(56) References Cited

U.S. PATENT DOCUMENTS

2018/0225875 A1\* 8/2018 Yasrebi .................... G06F 3/011
2019/0138797 A1\* 5/2019 Huang ............... G06K 9/00335

\* cited by examiner

AUGMENTED REALITY WEARABLE SYSTEM FOR VEHICLE OCCUPANTS

TECHNICAL FIELD

The present disclosure relates to augmented reality display systems, and more particularly, to wearable augmented reality display systems for automobile occupants.

BACKGROUND

Enhanced perception and realization of the external environment for the mobile customer when driving or riding in a vehicle is of significant value. Augmented Reality (AR) may assist in focusing the cognitive effort of users (e.g., vehicle drivers) by superimposing relevant information into the visual field-of-view of the user. In other aspects, AR may assist non-driving users (e.g., riders in a vehicle) by enhancing their perception and realization of the external environment with a personal display, interactive user interface, games, animations, and other experiences that may be shared with multiple users of an AR system in a vehicle.

Currently, vehicle-based AR systems provide a fixed field of view relative to the vehicle, such as a Heads Up Display (HUD) or a fixed display screen in a center stack or cluster. Conventional in-vehicle AR systems may only face forward, providing a limited field of view. As the external points of interest or other roadside scenes approach the moving vehicle, they quickly traverse out of the screen viewing window. Other delivery schemes for in-vehicle interactive content, such as center stack or cluster mount AR screens in conventional in-vehicle AR systems, may include larger fields of view than HUDs.

However, conventional systems including, center stack, cluster screen, and AR HUD may merely project the video stream facing forward. Although points of interest, pedestrians, etc., may be marked on the screens, they may not be within the driver's direct viewing angle. Stated in another way, drivers may have to move their eye gaze away from the road to direct their gaze at the display screen, or they may need to direct eye gaze back/forth or up/down, etc., on the screen in order to locate the corresponding targets in the real world outside the vehicle. Such actions may divert driver attention from the driving task.

German Patent Application Publication number DE102014009608 (hereafter "the '608 Publication"), describes an AR system that determines a relative position of the AR glasses with respect to an object within the field of view by transforming a coordinate system associated with the motor vehicle and a coordinate system associated with the AR glasses into a unified coordinate system. While teaching a mechanism for unifying disparate coordinate systems for objects in the field of view of the AR system, the '608 Publication does not provide virtual 3D tags for objects, or provide systems for identifying individual riders in the vehicle such that a customized AR experience may be provided based on user preferences. Moreover, the '608 Publication depends on the detection of the physical object by the sensors in the vehicle to display graphic data associate with the object. Therefore, the '608 Publication may not provide a solution for the cases when the physical object is far away or invisible (e.g. hidden behind other objects). Moreover, conventional AR vehicle systems such as the system of the '608 Publication may not provide a synchronized AR experience to multiple riders in a vehicle. These and other advantages of the present disclosure should not be construed as limiting and are contemplated.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
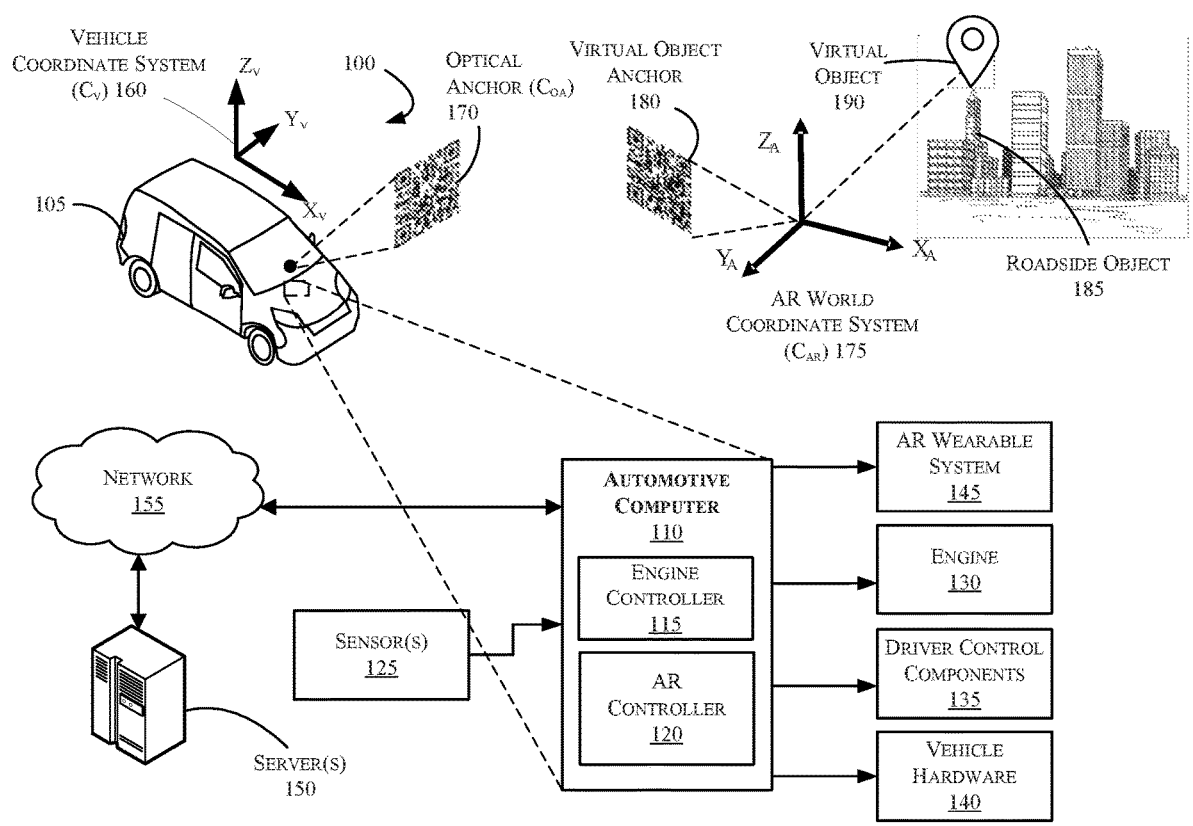
FIG. 1 depicts an illustrative architecture in which techniques and structures for providing the systems and methods disclosed herein may be implemented.

The systems and methods disclosed herein describe a wearable integrated augmented reality (AR) system for a vehicle configured to display road-side information in front of the wearer's direct gaze when they are driving and/or riding in the vehicle, and in some embodiments, when the wearer exits the vehicle as well. The disclosed system may include one or more wearable devices such as, for example, AR glasses, AR goggles, AR contact lenses, etc. The AR wearable device(s) may display road-side information associated with one or more points of interest (POIs) to the wearer's field of vision when they are driving and/or riding in the vehicle. For example, in the AR view, the system may tag a POI to a location in the external physical world, whereby the users of the AR system in the vehicle may share an integrated and coordinated AR experience.

The system may determine a location of a roadside object relative to the interior of the moving vehicle based on a vehicle Global Positioning System (GPS) or Global Navigation Satellite System (GNSS) message, a vehicle heading message, or other information. The system synchronizes a vehicle coordinate system with a virtual representation of the roadside object, and orients a driver AR wearable device with the synchronized vehicle coordinate system. The AR system may determine an identity of a user of the AR wearable system, and generate, based at least in part on the user ID associated with the user of the AR wearable device, a first virtual representation of the roadside object aligned with a GPS location and a direction of the vehicle. The system may transmit the first virtual representation to the AR wearable device, where it is presented in the visual field of view of the user to enhance the user's perception and realization of the external environment outside the moving vehicle.

The wearable AR devices described herein address limitations of conventional AR systems with Field of View limitations, because the individual wearing the disclosed AR wearable system(s) can rotate their head in any direction while in the moving vehicle as they interact with the AR system. The system users may thus become aware of any road-side situation promptly, without being limited by the particular direction of their eye gaze, and without Field of View limitations associated with conventional heads up displays (HUDs). Multiple vehicle occupants can view a personalized virtual image at the same time, and may also interact with time and location-synchronized images, making a coordinated AR experience possible for all the occupants of the vehicle. Moreover, system users with a wireless or mobile internet connection may use the vehicle AR system even after the occupants exit the vehicle. These and other advantages of the present disclosure are provided in greater detail herein.

ILLUSTRATIVE EMBODIMENTS

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "automobile," "vehicle," "car," and "truck" may be used interchangeably and should be understood in the context of the disclosure. Words such as "controls," "signals," "indication," and "information" may be used interchangeably and should be understood in the context of the disclosure. Furthermore, the word "information" as used herein may refer to various items such as digital data, analog data, audio content, video content, and/or messages. These items may be operated upon by a computer containing a processor. The phrase "pursuit mode of operation" as used herein is not limited to a police vehicle involved in a pursuit and can include other vehicles and operations such as an emergency vehicle (fire truck, ambulance etc.) being driven in response to an emergency. Phrases such as "a signal is transmitted" or "a door being opened" should not be construed exclusively in a singular sense. The phrase should be understood to also encompass "a set of signals" that may be transmitted (concurrently or sequentially) to one door and/or to multiple doors. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 illustrates an example computing environment 100 for practicing methods described herein. According to one embodiment, a vehicle 105 may travel a road or other route (not shown in FIG. 1), and approach a point of interest, such as, for example, a roadside object 185. Although depicted as a road sign, the roadside object 185 may be any object observable by occupants of the vehicle 105, such as, for example, a building, a landmark, a geographic feature, or any other type of object having a physical location. The roadside object 185 may be any observable point of interest, which may be an object, a person, an event (e.g., an automobile collision), a location in the field, a weather condition, an animal, or any other physical manifestation of interest to a vehicle occupant. Stated another way, the roadside object 185 may be a point of interest (POI) that can take the form of any of the above examples, or may take another physical form.

The vehicle 105 may be any type of passenger vehicle, such as, for example, a sedan, a bus, a van, a truck, etc. In some aspects, the vehicle 105 may operate as a manually-controllable vehicle, an autonomous vehicle where driving functionality is performed entirely by a computing platform onboard and/or off board the vehicle 105, or a semi-autonomous vehicle where aspects of the vehicle control are automatic and other aspects are user-controlled.

The vehicle 105 may include an engine 130, which may be and/or include a combustion engine, an electric motor, a hybrid drive system, and/or another actuation system.

The vehicle 105 can include an automotive computer 110. The automotive computer 110 may be installed in an engine compartment of a vehicle 105 (or elsewhere in the vehicle 105) as part of a vehicle augmented reality (AR) system in accordance with this disclosure. The automotive computer 110 may communicate with and/or be a part of a remote computing platform associated with one or more server(s) 150, which may communicate via one or more network(s) 155. In some embodiments, the automotive computer 110 can include the network adaptor(s) 210 (as shown in FIG. 2) for coupling to one or more network(s) 155.

The network(s) 155 may include one or more Internet protocol (IP)-based network(s) for communication between the automotive computer 110 and any external device. The network(s) 155 may transmit and receive data between the automotive computer 110 and devices and/or systems external to the automotive computer 110. For example, the automotive computer 110 may transmit occupant profile information associated with vehicle occupants (not shown in FIG. 1) to and from the server(s) 150, such that the automotive computer 110 may provide customized AR experiences to vehicle occupants (who may be users of the AR system). The AR experiences may be customized, in some example embodiments, based at least in part on user profile information described herein as occupant identifiers. For example, and as described in greater detail hereafter, the automotive computer 110 may transmit to and/or from the server(s) 150, one or more AR preferences associated with individual system users, such as a navigation preference, an animation preference, an audio preference, an AR game setting, a character setting, a motion setting, a brightness setting, etc.

In an example embodiment, the network(s) 155 can be implemented in a wireless fashion, e.g., using wireless protocols and technologies, such as Wi-Fi, WiMAX, and/or the like. The network(s) 155 can also connect with and/or include a wired network, an Ethernet network, a controller area network (CAN), etc. The network(s) 155 may also be and/or include a packet-switched network such as a local area network, wide area network, metropolitan area network, the Internet, or other similar types of network environments. The network(s) 155 can be and/or include a wireless local area network (LAN), a wireless wide area network (WAN) a personal area network (PAN), a virtual private network (VPN), intranet or another suitable network system.

Figure 2:
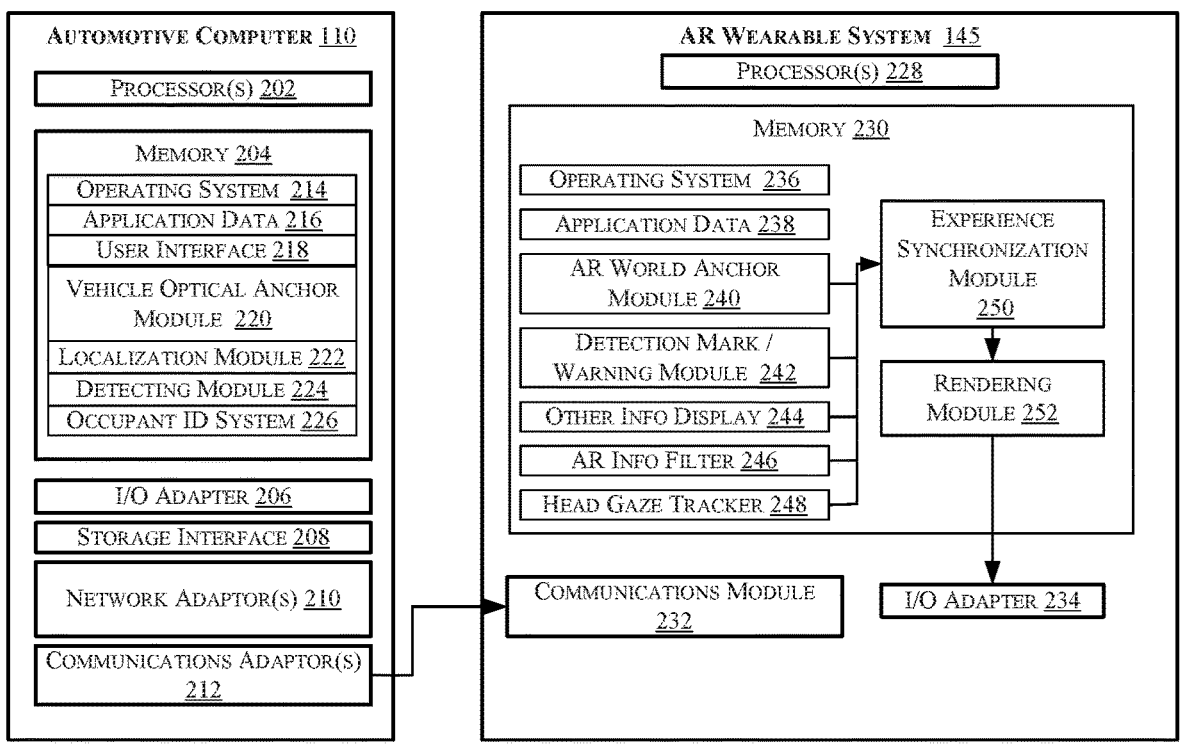
FIG. 2 is a functional schematic of computing systems utilized in accordance with the present disclosure.

The automotive computer 110, described in greater detail with respect to FIG. 2, may include an engine controller 115 for controlling an engine 130, for controlling one or more driver control components 135, and/or for controlling/retrieving data from other vehicle hardware 140 such as, for example, an infotainment system, a Global Positioning System (GPS), etc.

Augmented reality (AR) may be described as an interactive experience of a real-world environment where the objects that reside in the real-world are enhanced by computer-generated perceptual information, sometimes across multiple sensory modalities, including, for example, visual, auditory, haptic, and other modalities. The sensory information can be overlaid in a constructive (i.e. additive to the natural environment), or destructive (i.e. masking of the natural environment) way such that a real-world environment (e.g., the roadside object 185) may be overlaid with a digital enhancement or other information (e.g. the virtual object 190) that appears in the field-of-view of a user of the AR system. The real-world objects need not be necessary visible to the vehicle, for example, they are far away from the vehicle, or they are occluded by other objects (a building behind other buildings or landscape). Their locations are still obtained by the system (e.g. using GPS from a map system), and digital information displayed in wearable indicates their location and other related data that may be used to lead the vehicle to reach them.

As described in greater detail throughout the present disclosure, the automotive computer 110 may also include an augmented reality (AR) controller 120 for performing one or more aspects described herein. It should be appreciated that the AR controller 120, although depicted as part of the automotive computer 110, may also be part of or controllable entirely by the server(s) 150, and operate with the automotive computer 110 in a software as a service (SaaS) context. That is, the AR controller 120 may operate on the automotive computer 110 as a client service, where the automotive computer 110 is the client, and the server(s) 150 control portions of the AR system, or the entire AR system depicted in FIG. 1.

The engine controller 115, and/or the AR controller 120, may receive sensory information that provides environmental data from one or more sensor(s) 125. The sensor(s) 125 may include any number of devices configured or programmed to generate signals that help navigate the vehicle 105 while operating in a manual and/or an autonomous (e.g., driverless) mode. As an example, the sensor(s) 125 may include a depth camera, a video camera, etc., and may include computer vision software for detecting roadside situations and objects, such as pedestrian, traffic, road signs, etc. Additional examples of sensor(s) 125 may include a radar sensor, a light detection and ranging (LIDAR) device, a vision sensor, and/or the like. The sensor(s) 125 may help the vehicle 105 "see" the roadway and the vehicle surroundings and/or negotiate various obstacles while the vehicle is operating and in motion.

For example, FIG. 1 depicts the roadside object 185. The AR system depicted in FIG. 1 may create a virtual object 190 and visually overlaying to the roadside object 185 such as, for example, a visual effect, an animation, a lighting effect, etc. In other aspects, the AR system depicted in FIG. 1 may remove information from the roadside object 185, such as, for example, graffiti or other information that could be distracting. In another example, the AR system of FIG. 1 may remove distracting information such as video output in a passing vehicle output device that could distract a user of the AR system in FIG. 1. Although the limited examples provided herein describe particular AR experiences, it should be appreciated that an AR experience may take any form, limited only by the creativity of particular interactive applications that can be seamlessly interwoven with the physical world such that the AR experience is perceived as an immersive aspect of the real world environment. In this way, the AR systems described herein may alter and/or enhance one's ongoing perception of a real-world environment.

In one aspect, the AR systems described herein may interweave physical world objects such as the roadside object 185, which may change position with respect to the vehicle 105 as the vehicle 105 proceeds towards a destination, with holographic projections of virtual objects, colors, etc. Physical objects inside of the vehicle 105 may also be part of the AR experience, such that a user's vantage point of the roadside object 185 is coordinated with aspects of the user's physical environment in the interior of the vehicle 105. The AR controller 120, as described herein, may do this by receiving, from one or more integrated cameras (not shown in FIG. 1) associated with the AR wearable system 145, a video feed of the interior surfaces of the vehicle 105, captured data from sensor(s) 125 and GPS system, and establishing a unified coordinate system that coordinates interior surfaces of the vehicle 105 with the AR world that provide enhanced information for the real-world objects outside of the vehicle 105. The unified coordinate system may provide an AR experience that integrates the AR world with the interior surfaces of the vehicle 105. For example, the AR controller 120 may track an eye gaze and/or head pose direction of the AR wearable system 145, such that the AR controller 120 may represent the virtual object 190 attaching to the exterior roadside object 185 in a virtual AR space that seamlessly coordinates with the user's view of the vehicle interior, while changing the AR space in real time according to the physical direction of the user's eye gaze and/or head pose while wearing the AR wearable system 145.

One example coordinate system established by the AR controller 120 depicted in FIG. 1 is an augmented reality (AR) world coordinate system 175. FIG. 1 depicts the vehicle 105 as being associated with a vehicle coordinate system 160 (described mathematically as "$C_V$"). In some embodiments, the vehicle coordinate system 160 may have a mathematical representation that is different from the AR world coordinate system 175. For example, the vehicle coordinate system 160 may be expressed in terms of one or more sets of Cartesian coordinates in a Cartesian coordinate system.

The AR world coordinate system 175 is mathematically described hereafter as "$C_{AR}$". In some aspects, the AR world coordinate system 175 may be mathematically represented in Cartesian coordinates. In some aspects, the roadside object 185 may be located in a GPS messaging system (not shown in FIG. 1), where the location of some roadside object 185 is represented as a set of polar coordinates obtained from a map system, which is stored in the vehicle computer 110 or Server 150. Since polar coordinates are a different mathematical representation for orienting objects in physical 3D space than Cartesian coordinates, the AR controller 120, either alone or in conjunction with the AR wearable system 145, must translate the polar coordinates to a unified coordinate system (e.g., into Cartesian coordinates). The translation process is described in greater detail with respect to FIG. 2. In some aspects, the roadside object 185, which are close to the vehicle, may be sensed by the one or more sensor(s) 125, especially for Advanced Driver Assistance Systems (ADAS) functionalities, such as traffic/pedestrian detection, road sign recognition, etc. Since the sensor(s) 125 has fixed relationship with the vehicle, the sensed position of the roadside object 185 is directly represented in the unified coordinate system.

In one or more example embodiments, the AR controller 120 may synchronize the AR world coordinate system 175 ($C_{AR}$) with the vehicle coordinate system 160 ($C_V$) using an optical anchor 170 (described mathematically as "$C_{OA}$"). The optical anchor 170 may have a fixed relationship with the vehicle coordinate system 160 such that, $$C_{OA}=F(C_V),$$

where the optical anchor 170 $C_{OA}$ is a function of the vehicle coordinate system 160 $C_V$. In one example embodiment, the AR controller 120 may coordinate the vehicle coordinate system 160 with the AR world coordinate system 175 using one or multiple 2D image targets (e.g., the optical anchor 170) on at least one interior surface of the vehicle 105, such as a dashboard or headliner (not shown in FIG. 1). The plane of an image target (depicted in FIG. 1 as a plane defined by planar arrows Yv and Zv) may uniquely define two axes of the vehicle coordinate system 160, where a normal of the optical anchor 170 (defined as the vector arrow $X_v$) may define the 3rd axis in the coordinate system. In other aspects, other 3D interior surfaces of, for example, interior trims of the vehicle 105, or another component, can also serve as an optical anchor.

The AR wearable system 145 may include one or more cameras (not shown in FIG. 1) which are configured to obtain an image of the Optical Anchor 170. Inside the AR wearable system 145, the virtual object anchor 180 may uniquely define the AR World Coordinate System 175 ($C_{AR}$). In one aspect, the camera equipped in the AR wearable system 145 may track the optical anchor 170, and match the optical anchor 170 with its virtual twin (the virtual object anchor 180), and thus, align a first coordinate system with a second coordinate system based at least in part on the vehicle 105 interior surface upon which the optical anchor 170 is disposed. Stated in another way, the AR world coordinate system 175 ($C_{AR}$) may have a fixed relationship with optical anchor 170 such that, $$C_{AR}=G(C_{OA}),$$

where G is the function that deterministically associates the AR world coordinate system 175 ($C_{AR}$) with the coordinate system defined by the Optical Anchor ($C_{OA}$) which in turn has a fixed relationship with vehicle coordinate system ($C_V$). In some embodiments, the AR controller 120 may implement above functions (F and G) and continuously update the AR world coordinate system 175 such that it is synchronized with the vehicle coordinate system 160. Stated in another way, the $C_V$ is mapped in real-time to the AR world coordinate system 175 ($C_{AR}$). In some aspect, the 3D virtual object 190 displayed in the AR world coordinate system 175 may be overlaid correctly with the real-world roadside object 185. The relative position of roadside object 185 to the vehicle is calculated from its GPS coordinates.

FIG. 2 is a functional schematic of the automotive computer 110 and the AR wearable system 145, which may be utilized in accordance with the present disclosure. The automotive computer 110 and/or AR wearable system 145 described herein can be implemented in hardware, software (e.g., firmware), or a combination thereof.

As shown in FIG. 2, the automotive computer 110 may include the one or more processor(s) 202, and a memory 204 communicatively coupled to the one or more processor(s) 202. The automotive computer 110 may operatively connect to and communicate information with one or more internal and/or external memory devices such as, for example, one or more databases (not shown in FIG. 2) via a storage interface 208. For example, in one embodiment, the automotive computer 110 may connect to and communicate information with an internal and/or external database, such as the occupant profile database 300 described in greater detail hereafter with respect to FIG. 3.

The automotive computer 110 may include one or more network adaptor(s) 210 enabled to communicatively connect the automotive computer 110 with the one or more network(s) 155 (shown in FIG. 1). In some example embodiments, the network(s) 155 may be or include a telecommunications network infrastructure. In such embodiments, the automotive computer 110 can further include one or more communications adaptor(s) 212.

The automotive computer 110 may further include and/or connect with one or more input devices (e.g., the sensor(s) 125 as shown in FIG. 1) and/or one or more output devices (not shown in FIG. 2) through the I/O adapter 206.

The one or more processor(s) 202 are collectively a hardware device for executing program instructions (aka software), stored in a computer-readable memory (e.g., the memory 204). The one or more processor(s) 202 may embody a commercially-available processor, a central processing unit (CPU), a plurality of CPUs, an auxiliary processor among several other processors associated with the automotive computer 110, a semiconductor-based microprocessor (in the form of a microchip or chipset), or generally any device for executing program instructions.

The one or more processor(s) 202 may be disposed in communication with one or more memory devices (e.g., the memory 204 and/or one or more external databases, etc.) via a storage interface 208. The storage interface 208 can also connect to one or more memory devices including, without limitation, one or more other memory drives (not shown in FIG. 2) including, for example, a removable disc drive, a vehicle computing system memory, cloud storage, etc., employing connection protocols such as serial advanced technology attachment (SATA), integrated drive electronics (IDE), IEEE-1394, universal serial bus (USB), fiber channel, small computer systems interface (SCSI), etc.

The memory 204 can include random access memory (RAM) such as, for example, dynamic random access memory (DRAM), synchronous random access memory (SRAM), synchronous dynamic random access memory (SDRAM), etc., and read-only memory (ROM), which may include any one or more nonvolatile memory elements (e.g., erasable programmable read-only memory (EPROM), flash memory, electronically erasable programmable read-only memory (EEPROM), programmable read-only memory (PROM), tape, compact disc read-only memory (CD-ROM), etc.). Moreover, the memory 204 can incorporate electronic, magnetic, optical, and/or other types of non-transitory computer-readable storage media. In some example embodiments, the memory 204 may also include a distributed architecture, where various components are physically situated remotely from one another, but can be accessed by the one or more processor(s) 202.

The instructions in the memory 204 can include one or more separate programs, each of which can include an ordered listing of computer-executable instructions for implementing logical functions. In the example of FIG. 2, the instructions in the memory 204 can include an operating system 214. The operating system 214 can control the execution of other computer programs such as, for example the AR controller 120 (as depicted in FIG. 1), and/or the engine controller 115, and may provide scheduling, I/O control, file and data management, memory management, and communication control and related services.

The program instructions stored in the memory 204 can further include application data 216, and instructions for controlling and/or interacting with the computer through a user interface 218. The application data 216 may include, for example, one or more databases such as the occupant profile database 300 depicted in FIG. 3.

The I/O adapter 206 can connect a plurality of input devices (not shown in FIG. 2) to the automotive computer 110. The input devices can include, for example, a keyboard, a mouse, a microphone, a sensor, etc. The I/O adapter 206 can further include a display adapter coupled to one or more displays, such as, for example, the vehicle hardware 140 which may include an infotainment system. The I/O adapter 206 can be configured to operatively connect one or more input/output (I/O) devices to the automotive computer 110. For example, the I/O adapter 206 can connect a keyboard and mouse, a touchscreen, a speaker, a haptic output device, or other output device (not shown in FIG. 2). The output devices can include but are not limited to a printer, a scanner, and/or the like. Other output devices can also be included, although not shown in FIG. 2. Finally, the I/O devices connectable to the I/O adapter 206 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some example embodiments, the automotive computer 110 can include one or more communications adapter(s) 212. The communications adapter(s) 212 can include a global positioning system (GPS), cellular, mobile, and/or other communications protocols for wireless communication. In some aspects, the vehicle hardware 140 (shown in FIG. 1) may communicate information to and from the automotive computer 110 via the communications adaptor(s) 212, which may include, for example, information associated with the AR wearable system 145.

An example augmented reality (AR) wearable system 145 may include a plurality of modules for providing an AR experience to vehicle occupants, including, for example, one or more wearable AR devices that may be worn by the driver and/or any number of riders of the vehicle. The memory 204 can also include program instructions for communicating information to and from the AR wearable system 145 via one or more communications adaptor(s) 212. For example, the memory 204 may include a localization module 222, a detecting module 224, and an occupant identification (ID) system 226.

As explained in FIG. 1, the optical anchor 170 may be disposed on an interior surface of the vehicle 105. A camera (not shown in FIGS. 1-2) disposed and/or communicatively coupled with the AR wearable system 145 may track and synchronize the AR world coordinate system 175 with the vehicle coordinate system 160. The localization module 222 may include one or more sensors (e.g., the sensor(s) 125 as shown in FIG. 1) in the vehicle 105, where the sensor(s) may be used to determine the location and orientation of the vehicle 105 with respect to other features exterior to the vehicle, which may be oriented in 3D space using positioning systems such as a GPS.

The detecting module 224 may include software instructions configured for receiving and interpreting sensor information from the sensor(s) 125 (as depicted in FIG. 1). For example, the detecting module 224 may receive data from one or more detecting sensors such as depth cameras, video cameras, a LIDAR, etc., and/or may include computer vision software configured to detect roadside objects based at least in part on the data received from the detecting sensors.

The network adaptor(s) 210 may include one or more internet of things (IoT)-connected devices and/or modules such as, for example, a cloud module. The network adaptor(s) 210 may connect the vehicle 105 to the network(s) 155 to retrieve data, such as weather and/or POI information. For example, the network adaptor(s) 210 may connect with the network(s) 155 to obtain information associated with a landmark, a geographic feature, a road feature, a map, a building, a business, etc.

The occupant ID system 226 may identify one or more riders and/or drivers (collectively occupants) when they enter the vehicle, and retrieve occupant identifiers associated with the one or more occupants. The occupant ID system 226 may assign a unique ID to individual users such that the occupant identifier includes occupant-specific information that may be used to provide a unique AR experience to each vehicle occupant. Example information may include, for example, navigation preferences, animation preferences, audio preferences, AR game settings, and other information that may indicate user-preferred AR settings. In other aspects, the occupant identifiers may include one or more details associated with the vehicle 105 such as, for example, a vehicle identification (ID), vehicle Quick Response (QR) encoding(s) that uniquely associate a particular vehicle interior with one or more database entries such as an occupant identifier, and one or more wearable device identifiers that identify particular AR devices that have been associated with particular occupant(s).

For example, in one embodiment, the processor(s) 202 may receive, via a CAN network associated with the vehicle 105, an image of the user that is the driver of the AR wearable system 145. Accordingly, one or more cameras (not shown in FIGS. 1-2) inside of the vehicle 105 may obtain a facial image of the driver user, and transmit the image to the processor(s) 202 for user identification. The processor(s) 202 may generate a plurality of gradient vectors associated with the image of the user, such as, for example, gradient vectors associated with facial features of the user (e.g., distance between corners of the eyes, angle of respective features such as mouth and eye corners, etc.). The processor(s) 202 may identify at least one facial landmark from the plurality of gradient vectors, and compare the at least one facial landmark to a plurality of facial landmarks associated with at least one prior occupant of the vehicle. For example, a facial landmark may include angles of the corners of the occupant's eyes and an angle formed between the corners of the user's mouth and a nasal feature. The at least one facial landmark may be identified from the plurality of gradient vectors, by retrieving occupant profile data associated with the user image. The processor(s) 202 may determine a match associated with the at least one facial landmark and the landmark data associated with the profile data, and change one or more stored AR experience settings based at least in part on the occupant profile data. It should be appreciated that the facial recognition steps described herein are example steps only to illustrate known methods for determining user identity using facial features, and should not be considered limiting.

The communications adaptor(s) 212 may collect data from the vehicle 105, and transfer the data between the AR wearable system 145, the automotive computer 110, and/or the server(s) 150. The communication adaptor(s) 212 and a communications module 232 associated with the AR wearable system 145 may transfer information between the computing systems via one or more data transfer protocols including, for example, Wi-Fi, or Bluetooth®, Bluetooth Low-Energy®, and/or another data transfer protocol. Data transferred may include navigational messages including, for example, a vehicle location, a vehicle heading, one or more roadside detection results, and other information.

The AR wearable system 145 may include a plurality of modules that work in conjunction with the in-vehicle AR system operating as part of and/or via the automotive computer 110. For example, the AR wearable system 145 may include an operating system 236, application data 238, an AR world anchor module 240, a detection mark/warning module 242, other information display module 244, an AR information filter 246, and/or a head/gaze tracker 248.

The AR world anchor module 240 may be configured to track the optical anchor 170 of the vehicle 105 (depicted in FIG. 1). The AR world anchor module may include an AR location calculator configured to compute a location of exterior roadside objects (e.g., the roadside object 185) relative to the vehicle 105.

The detection mark/warning module 242 may be configured to generate geometry and/or messages that alert occupants of roadside situations, such as, for example, traffic incidents, road construction, weather alerts, road closures, etc.

The other information display module 244 may be configured to display information that the AR wearable system 145 may receive from the IoT/cloud connection inside the vehicle 105, and more particularly, via the automotive computer 110.

Figure 3:
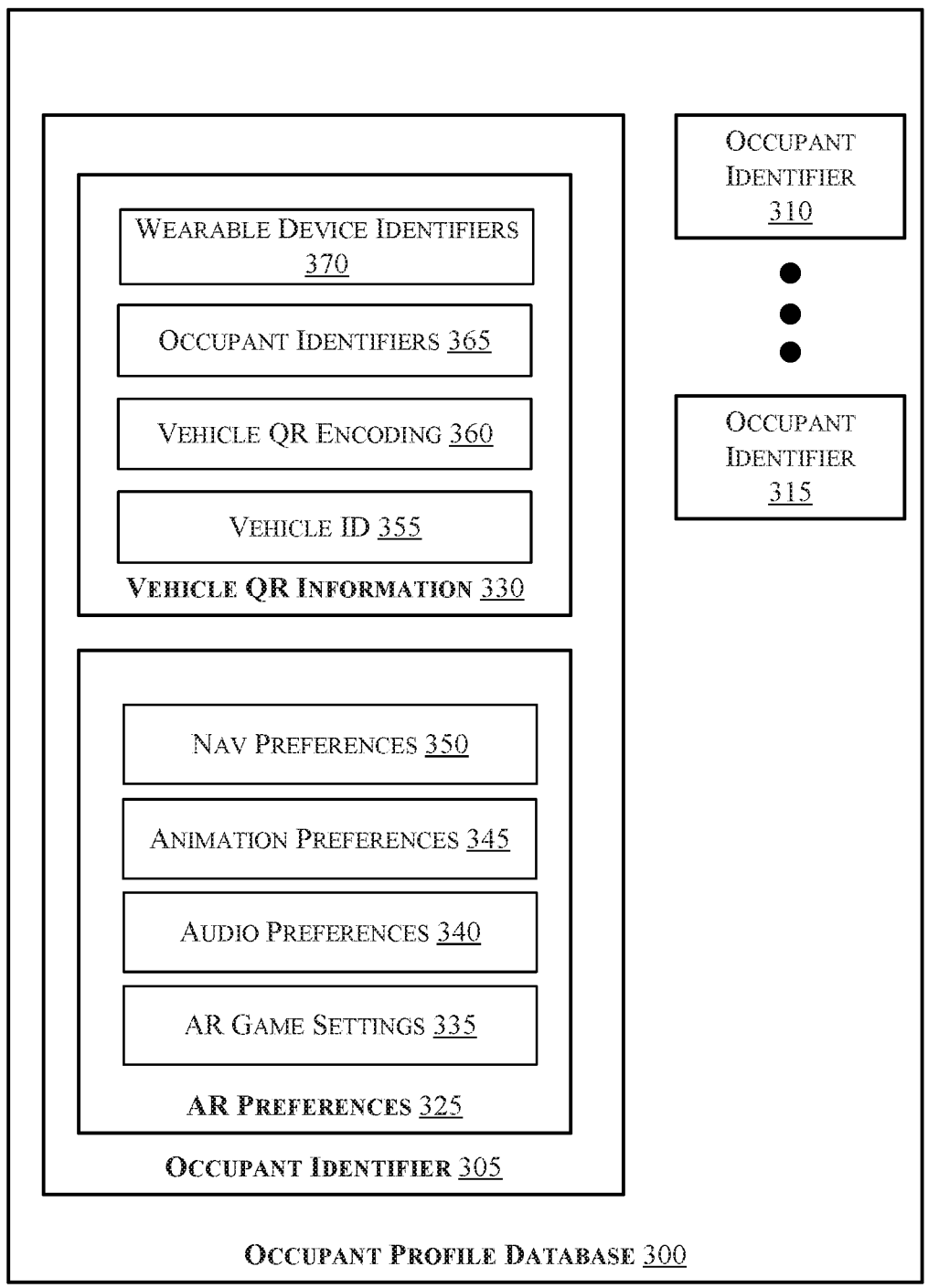
FIG. 3 is a block diagram of an occupant profile database utilized in accordance with the present disclosure.

The AR wearable system may further include the AR information filter 246 configured to filter AR content based on an occupant identifier, and further based on an estimated distance between the vehicle 105 and the roadside object 185, based at least in part on an eye gaze and/or head pose direction of the vehicle occupant wearing and/or operating the AR wearable system 145, and/or based on user preferences associated with the occupant profile database (the database being described hereafter with respect to FIG. 3).

The AR wearable system 145 may further include a head/gaze tracker 248 configured to track the user's head and gaze orientation while wearing and/or operating the AR wearable system 145, and an experience synchronization module 250 configured to coordinate an AR experience with a plurality of AR wearable systems (one of which being the AR wearable system 145).

The AR wearable system 145 may also include a rendering module 252 that may generate 3D virtual objects (e.g., the virtual object 190) that are viewable in the rendering module 252. In one example embodiment, the rendering module 252 may generate a virtual 3D object such as a point-of-interest (POI) tag. A POI tag may be, for example, an animated logo or description of a business operating at a geographic location, where the AR wearable system 145 outputs the POI tag as a holographic image that interacts with real-world features and objects as the vehicle 105 approaches the address at which the business operates. One such POI tag may be, for example, an animated graphic of the business logo rotating in a virtual 365-degree rotation at a virtual location that appears in the user's field of view through the I/O adapter 234 of the AR wearable system 145. In an example, the POI tag may virtually appear above a roof of the business or other geographic point. In another embodiment, the POI tag may include text or other descriptive information associated with a geographic feature such as a mountain, a valley, a bluff, a field, a lake, etc. In another embodiment, the POI tag may indicate a vehicle make, a vehicle model, etc. In another embodiment, the POI may identify a social media connection in a passing vehicle or on the roadside, and/or may provide any other type of information of interest to a user. Other types of animations, points-of-interest, tag types, etc., are possible, and contemplated.

In one aspect, the localization module 222 of the automotive computer 110 may synchronize coordinate systems to a unified Cartesian coordinate system (e.g., the AR world coordinate system 175) based at least in part on one or more anchor points by mounting one or more 2D image targets (e.g., the optical anchor 170) onto an interior surface of the vehicle 105. In one example embodiment, the localization module 222 may use one or more encoding schemes such as, for example, an Augmented Reality Markup Language (ARML) encoding scheme to mathematically describe and interact with augmented reality (AR) scenes observed by the AR wearable system 145. One such example encoding scheme, among many possible encoding schemes, is an encoding scheme developed within the Open Geospatial Consortium (OGC) by a dedicated ARML 2.0 Standards Working Group. In this example embodiment, the ARML encoding scheme may include an extensible markup language (XML) grammar to describe the location and appearance of virtual objects in the scene, to allow dynamic access to the properties of the virtual objects (e.g., the virtual object 190), as well as event handling. ECMA Script (or ES) is a scripting-language specification standardized by ECMA International in ECMA-262 and ISO/IEC 16262. It was created to standardize JavaScript, so as to foster multiple independent implementations such as, for example, the embodiments described herein.

ARML, as one possible implementation of an encoding scheme, focuses on visual augmented reality where the camera of an AR-capable device (the AR wearable system 145) serves as the main output for augmented reality scenarios. The ARML object model consists of three main concepts: First, object features may represent the physical object that should be augmented (e.g., the roadside object 185). A second object model may include one or more Visual Assets that may describe an appearance of the virtual object in the augmented scene. An example visual asset may be one or more animations, sounds, tactile feedback instructions, etc., that may be associated with the roadside object 185. A third object model may include one or more anchors that describe the spatial relation between the various physical aspects such as the vehicle 105, the roadside object 185, and the virtual representation(s) of the roadside object 185 (not shown in FIGS. 1-2). One example of the third object model in the ARML object model scheme is often referred to as a "RelativeTo" anchor. In ARML object models, a RelativeTo anchor may allow the definition of a location of an object (e.g., the roadside object 185) relative to other Anchors (e.g., the virtual object anchor 180 as shown in FIG. 1) or the user's position within the vehicle 105. The RelativeTo anchor may allow setup of a scene, and the location of all included virtual objects (e.g., the virtual object 190) in the scene based on a single Anchor, such as, for example, the optical anchor 170. In an example embodiment, the RelativeTo information may be stored as part of the occupant profile database 300 (FIG. 3), and/or any other information stored as the application data 216 and/or the application data 238.

In one example embodiment, the localization module 222 may generate a virtual twin (the virtual object anchor 180) that defines the coordinate system of the AR world. The AR world coordinate system 175 may be oriented based at least in part on the virtual object anchor 180, operating as the virtual twin of the optical anchor 170. The camera associated with the AR wearable system 145 may continuously track the optical anchor 170, and match the virtual twin of the wearable AR system 145 to align the two coordinate systems 175 and 160. This act may cause all of the virtual 3D objects created by the AR wearable system 145 to have correct locations relative to the vehicle 105.

In the physical world, the geolocations of both the vehicle 105 and the roadside object 185 may be identified by GPS coordinates defined in a polar coordinate system on the Earth. The polar coordinate system generally includes a latitude and a longitude. In order to calculate the relative location from the roadside object 185 to the vehicle 105, the geolocation of the vehicle 105 and the geolocation of the roadside object 185 are converted from the polar system natural to the GPS data to a Cartesian system that may include X coordinate values and Y coordinate values in a local map (not shown in FIG. 2).

For example, the AR controller 120 (shown in FIG. 1) may perform this conversion calculation using the localization module 222 by receiving one or more GPS messages from the vehicle hardware 140 (shown in FIG. 1) with vehicle headings and/or other information. The AR controller 120 may convert the GPS message(s) from latitude and longitude, including a degree, minutes, and seconds format to a Cartesian coordinate system comprising a decimal degree format. For example, the AR controller 120 may consider the GPS coordinates of the vehicle 105 (expressed in FIG. 1 as the vehicle coordinate system 160) as an origin, consider the GPS coordinates of a point of interest (e.g., the GPS coordinates associated with the roadside object 185 in FIG. 1) and vehicle heading angle, and convert the GPS coordinates of the roadside object 185 to Cartesian coordinates with respect to the vehicle coordinate system 160.

FIG. 3 depicts an occupant profile database 300 that may be used in conjunction with one or more embodiments described herein. For example, the occupant profile database 300 may include a plurality of occupant identifiers 305, 310, 315, etc., that may be associated with unique users of the AR wearable system 145. In one aspect, the occupant ID system 226 depicted in FIG. 2 may identify one or more riders and/or drivers (collectively occupants) when they enter the vehicle 105, retrieve an occupant identifier associated with the one or more occupants (e.g., the occupant identifier 305), and assign a unique ID to them such that the occupant identifier 305 includes occupant-specific information that may be used to provide a unique AR experience to each occupant. Example information of AR preferences 325 may include, for example, one or more navigation preferences 350 that may describe user preferences for interacting with navigational aspects of the AR wearable system 145. In one example, a navigational preference may be related to and/or include a color code associated with a direction of travel, navigational instruction, a travel direction presented to the viewer, and/or any other possible navigational preference associated with providing and/or receiving navigational directions.

The occupant identifier 305 may also include one or more animation preferences 345 that may describe preferences associated with animation of the virtual POIs and other objects. For example, an animation preference may include a rotational speed of a POI tag or other object, a relative size of the POI object, a language setting, and/or another animation preference.

The occupant identifier 305 may further include one or more audio preferences 340, which may describe audio settings such as music, volume, etc.

The occupant identifier 305 may also include one or more AR game settings 335, which may be indicative of preferred AR games playable and/or played by occupants.

The occupant identifier 305 may also include vehicle specific QR information 330, which may indicate unique vehicles associated with occupant identifiers 305-315. For example, the occupant identifiers 365 may identify users associated with a vehicle, where the users are also associated with other vehicles operated regularly within a family group and/or a rideshare group. Other information may include wearable device identifiers 370, and other information that may indicate preferred AR settings. In other aspects, the occupant identifiers may include one or more vehicle identifications (IDs) 355, and one or more vehicle QR encoding(s) 360 that uniquely associate particular vehicle interiors with one or more occupant identifiers. The occupant identifier 305 depicted in FIG. 3 is not intended to be exclusive or limiting, and merely provides one example of information that may be stored and/or used by the automotive computer 110 and/or the AR wearable system 145 to customize a unique AR experience for a user of the AR wearable system 145.

Figure 4:
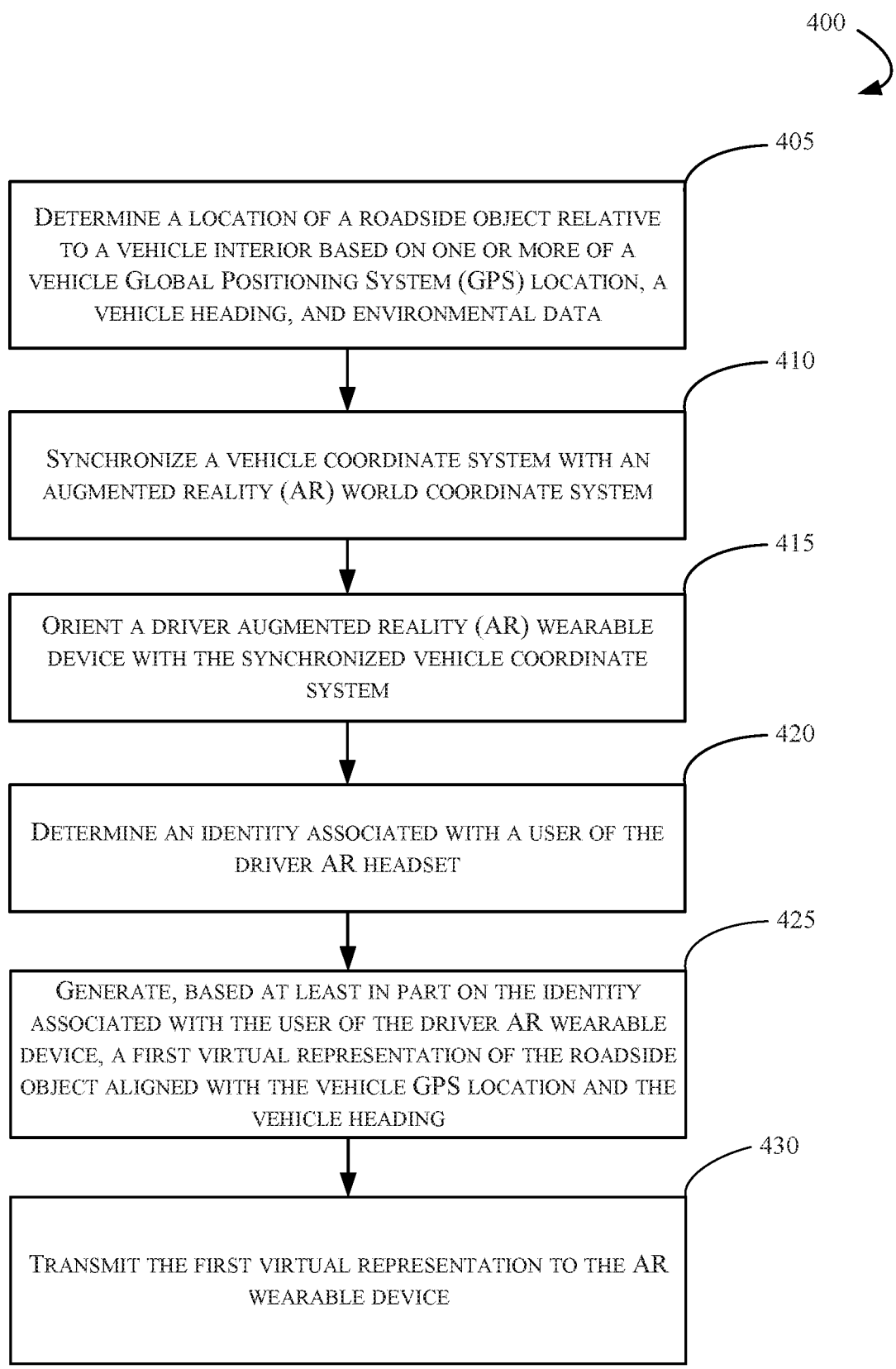
FIG. 4 is a flowchart of an example method related to augmented reality content delivery in accordance with the present disclosure.

FIG. 4 is a flowchart of an example method 400 of the present disclosure. The method 400 commences with a first step 405 that may include determining a location of a roadside object relative to a vehicle interior based on one or more of a vehicle global position system (GPS) location, a vehicle heading, and/or environmental data obtained from one or more sensors disposed onboard the vehicle. In one aspect, determining the location of the roadside object may include generating a synchronized vehicle coordinate system (e.g., the AR world coordinate system 175) associated with a virtual representation of a vehicle interior of the vehicle 105. As used herein, a virtual representation may include one or more digital models of an object that can be displayed in an output device. The virtual representations described herein may be two-dimensional digital representations of real-world objects and/or fictional objects, three-dimensional digital representations of those objects, representations of text, sounds, or other representations associated with the computing environment.

At step 410, the method may include synchronizing a vehicle coordinate system with an AR world coordinate system in which a first virtual representation of the roadside object is generated. The synchronizing may include, for example, generating a first virtual representation of the roadside object in an AR world coordinate system, assigning a first coordinate system to the virtual representation of the vehicle interior, assigning a second coordinate system to the AR world in which the virtual object 190 (that may attach to an object external to the vehicle) is displayed, and synchronizing the first coordinate system and the second coordinate system to Cartesian coordinates based at least in part on an anchor point associated with a vehicle interior surface. The synchronizing may further include receiving, via a CAN network associated with the vehicle 105, a GPS message that can include the vehicle 105 GPS location, assigning a vehicle origin to the virtual representation of the vehicle 105 interior, and converting the vehicle GPS location from a polar coordinate system to a Cartesian coordinate system. The synchronizing may further include generating the synchronized vehicle coordinate system based at least in part on the first coordinate system and the second coordinate system. In some aspects, the AR wearable system 145 may be oriented with the virtual representation of the vehicle 105 interior, and a virtual representation of the roadside object 185.

At step 415, the method may include orienting a driver augmented reality (AR) wearable device with the synchronized vehicle coordinate system. In one aspect, orienting the AR wearable system 145 may include generating, via the AR wearable system 145, a second virtual representation of the roadside object 185. The automotive computer 110 may align the second virtual representation of the roadside object with the vehicle GPS location, the vehicle heading, and the first virtual representation of the roadside object 185.

At step 420, the method may include determining an identity associated with a user of the driver AR headset. At step 425, the method includes generating, based at least in part on the identity associated with the user of the driver AR wearable device, a first virtual representation of the roadside object aligned with the vehicle GPS location and the vehicle heading.

At step 430, the method may include transmitting the first virtual representation to the driver AR wearable device.

Aspects of the present disclosure may provide several advantages over conventional methods. For example, in some embodiments, the AR system does not have any visual Field of View (FoV) limitations because the driver wearing the AR wearable system 145 can rotate their head in any direction while operating the vehicle 105. This feature may provide drivers with additional advantages associated with safety features that, utilizing the present disclosure, are not outside of their FoV. Riders using the AR wearable system 145 may also be independently aware of roadside situations and points of interest. In other aspects, multiple occupants can view personalized virtual images and customize their AR experience according to individual user preference. Individual users may interact with the same AR environment simultaneously. Yet other advantages may include the ability for AR wearable system 145 users to interact with the AR environments even when exiting the vehicle 105, or using the AR wearable system 145 with a wireless or mobile connection through a mobile device (not shown in FIGS. 1-4). Accordingly, the AR wearable system 145 may continue to provide users with an AR experience after users of the AR wearable system 145 exit the vehicle 105. Other advantages are contemplated and possible.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Computing devices may include computer-executable instructions, where the instructions may be executable by one or more computing devices such as those listed above. Computer programs may compile or interpret computer-executable instructions using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media.

Databases, data repositories or other data stores described herein may include various kinds of mechanisms for storing, accessing, and retrieving various kinds of data. Example mechanisms for storage may include a hierarchical database, a set of files in a file system, an application database in a proprietary format, a relational database management system (RDBMS), etc. The data stores may also include one or more computing devices, and an operating system such as one of those mentioned above.

In some examples, system elements may be implemented as computer-readable instructions (e.g., software) on one or more computing devices (e.g., servers, personal computers, etc.), and stored on computer readable media associated therewith (e.g., disks, memories, etc.). A computer program product may comprise such instructions stored on computer readable media for carrying out the functions described herein.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telecommunication devices, and the like.

The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms used throughout the description and claims refer to particular system components. As one skilled in the art will appreciate, components may be referred to by different names. This document does not intend to distinguish between components that differ in name, but not function.

It should be noted that the sensor embodiments discussed herein can include computer hardware, software, or any combination thereof to perform at least a portion of their functions. In one or more non-limiting examples described herein, a sensor may include computer code configured for execution in one or more processors and may include hardware logic/electrical circuitry controlled by the computer code.

While various embodiments of the present disclosure have been described above, it should be understood that the foregoing description has been presented for the purposes of illustration and description. It is not intended to be exhaustive or to limit the present disclosure to the precise form disclosed. Any or all of the aforementioned alternate implementations may be used in any combination desired to form additional hybrid implementations of the present disclosure. For example, any of the functionality described with respect to a particular device or component may be performed by another device or component.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not intended to imply that features, elements, and/or steps are in any way required for one or more embodiments.

That which is claimed is:

1. A method, comprising:
   determining a location of a roadside object relative to a vehicle interior based on one or more of a vehicle Global Positioning System (GPS) location, a vehicle heading, and environmental data received via one or more sensors;
   generating a first virtual representation of the roadside object in an augmented reality (AR) world coordinate system;
   synchronizing a vehicle coordinate system with the AR world coordinate system;
   orienting a driver AR wearable device with the synchronized vehicle coordinate system;
   determining an identity associated with a user of the driver AR wearable device;
   generating, based at least in part on the identity associated with the user of the driver AR wearable device, a first virtual representation of the roadside object associated with the AR world coordinate system and aligned with the vehicle GPS location and the vehicle heading; and
   transmitting the first virtual representation to the driver AR wearable device, wherein determining the location of the roadside object comprises generating a synchronized vehicle coordinate system associated with a virtual representation of a vehicle interior, and wherein generating the synchronized vehicle coordinate system comprises:
   assigning a first coordinate system to the virtual representation of the vehicle interior;
   assigning a second coordinate system to the AR world coordinate system associated with the virtual representation of the vehicle interior; and
   synchronizing the first coordinate system and the second coordinate system to Cartesian coordinates based at least in part on an anchor point associated with a vehicle surface.

2. The method according to claim 1, further comprising:
   orienting a rider AR wearable device synchronized with the vehicle coordinate system; and
   generating, via the rider AR wearable device, a second virtual representation of the roadside object in the AR world coordinate system, which is aligned with the vehicle GPS location, the vehicle heading, and the first virtual representation of the roadside object.

3. The method according to claim 1, wherein generating the synchronized vehicle coordinate system further comprises:
   receiving, via a vehicle network, a GPS message comprising the vehicle GPS location;
   assigning a vehicle origin to the virtual representation of the vehicle interior;
   converting the vehicle GPS location from a polar coordinate system to a Cartesian coordinate system; and
   generating the synchronized vehicle coordinate system based at least in part on the first coordinate system and the second coordinate system, wherein the driver AR wearable device is oriented with the virtual representation of the vehicle interior and the virtual representation of the roadside object.

4. The method according to claim 1, wherein determining the identity associated with the user of the driver AR wearable device comprises:
- receiving an image of the user of the driver AR wearable device;
- generating a plurality of gradient vectors associated with the image of the user;
- identifying at least one facial landmark from the plurality of gradient vectors;
- comparing the at least one facial landmark to a plurality of facial landmarks associated with at least one prior occupant of the vehicle;
- retrieving occupant profile data associated with a match associated with the at least one facial landmark; and
- changing one or more AR experience settings based at least in part on the occupant profile data.

5. The method according to claim 4, wherein the AR experience settings comprise one or more of a sound setting, a brightness setting, a motion setting, and a character setting.

6. A system, comprising:
- a processor; and
- a memory for storing executable instructions, the processor configured to execute the instructions to:
  - determine a location of a roadside object relative to a vehicle interior based on one or more of a vehicle Global Positioning System (GPS) location, a vehicle heading, and environmental data;
  - generate a first virtual representation of the roadside object in an augmented reality (AR) world coordinate system;
  - synchronize a vehicle coordinate system with the AR world coordinate system;
  - orient a driver AR wearable device with the synchronized vehicle coordinate system;
  - determine an identity associated with a user of the driver AR wearable device;
  - generate, based at least in part on the identity associated with the user of the driver AR wearable device, a first virtual representation of the roadside object associated with the AR world coordinate system aligned with the vehicle GPS location and the vehicle heading;
  - transmit the first virtual representation to the driver AR wearable device;
  - assign a first coordinate system to a virtual representation of the vehicle interior;
  - assign a second coordinate system to an AR world coordinate system in which the virtual representation of an object external to the vehicle is generated;
  - synchronize the first coordinate system and the second coordinate system to Cartesian coordinates based at least in part on an anchor point associated with a vehicle surface; and
  - generate the synchronized vehicle coordinate system based at least in part on the Cartesian coordinates.

7. The system according to claim 6, wherein the processor is further configured to execute the instructions to:
- orient a rider AR wearable device synchronized with the vehicle coordinate system; and
- generate, via the rider AR wearable device, a second virtual representation of the roadside object in the AR world coordinate system, which is aligned with the vehicle GPS location, the vehicle heading, and the first virtual representation of the roadside object.

8. The system according to claim 6, wherein the processor is configured to execute the instructions to generate a synchronized vehicle coordinate system associated with a virtual representation of a vehicle interior.

9. The system according to claim 6, wherein the processor is configured to execute the instructions to:
- receive, via a vehicle network, a GPS message comprising the vehicle GPS location;
- assign a vehicle origin to the virtual representation of the vehicle interior;
- convert the vehicle GPS location from polar coordinates to Cartesian coordinates; and
- generate the synchronized vehicle coordinate system based at least in part on the first coordinate system and the second coordinate system, wherein the driver AR wearable device is oriented with the virtual representation of the vehicle interior and a virtual representation of the roadside object.

10. The system according to claim 6, wherein the processor is configured to execute the instructions to:
- receive, via a vehicle network, an image of the user of the driver AR wearable device;
- generate a plurality of gradient vectors associated with the image of the user;
- identify at least one facial landmark from the plurality of gradient vectors;
- compare the at least one facial landmark to a plurality of facial landmarks associated with at least one prior occupant of the vehicle;
- retrieve occupant profile data associated with a match associated with the at least one facial landmark; and
- change one or more AR experience settings based at least in part on the occupant profile data.

11. The system according to claim 10, wherein the AR experience settings comprise one or more of a sound setting, a brightness setting, a motion setting, and a character setting.

12. An augmented reality (AR) wearable device, comprising:
- a processor; and
- a memory for storing executable instructions, the processor configured to execute the instructions to:
  - receive, via one or more sensors, environmental data;
  - generate, based at least in part on the environmental data, a first virtual representation of a roadside object in an AR world coordinate system;
  - determine a location of a roadside object relative to a vehicle interior based on one or more of a vehicle Global Positioning System (GPS) location, a vehicle heading, and the environmental data;
  - synchronize a vehicle coordinate system with the AR world coordinate system, in which the first virtual representation of the roadside object is generated;
  - orient a driver augmented reality (AR) wearable device with the synchronized vehicle coordinate system;
  - determine an identity associated with a user of the AR wearable device;
  - generate, based at least in part on the identity associated with the user, a first virtual representation of the roadside object associated with the AR world coordinate system and aligned with the vehicle GPS location and the vehicle heading; and
  - output the first virtual representation;
  - assign a first coordinate system to a virtual representation of the vehicle interior;
  - assign a second coordinate system to an AR world coordinate system, in which a virtual representation of an object external to the vehicle is generated;

synchronize the first coordinate system and the second coordinate system to Cartesian coordinates based at least in part on an anchor point associated with a vehicle surface; and
   generate the synchronized vehicle coordinate system based at least in part on the Cartesian coordinates.

13. The device according to claim 12, wherein the processor is further configured to execute the instructions to:
   synchronize the device with the vehicle coordinate system; and
   generate, via an input/output (I/O) adapter, a second virtual representation of the roadside object in the AR world coordinate system, which is aligned with the vehicle GPS location, the vehicle heading, and the first virtual representation of the roadside object.

14. The device according to claim 12, wherein the processor is configured to execute the instructions to generate a synchronized vehicle coordinate system associated with a virtual representation of a vehicle interior.

15. The device according to claim 12, wherein the processor is configured to execute the instructions to:
   receive, via a vehicle network, a GPS message comprising the vehicle GPS location;
   assign a vehicle origin to the virtual representation of the vehicle interior;
   convert the vehicle GPS location from polar coordinates to Cartesian coordinates; and
   generate the synchronized vehicle coordinate system based at least in part on the first coordinate system and the second coordinate system, wherein the driver AR wearable device is oriented with the virtual representation of the vehicle interior and a virtual representation of the roadside object.

16. The device according to claim 12, wherein the processor is configured to execute the instructions to:
   receive, via a vehicle network, an image of the user of the driver AR wearable device;
   generate a plurality of gradient vectors associated with the image of the user;
   identify at least one facial landmark from the plurality of gradient vectors;
   compare the at least one facial landmark to a plurality of facial landmarks associated with at least one prior occupant of the vehicle;
   retrieve occupant profile data associated with a match associated with the at least one facial landmark; and
   change one or more AR experience settings based at least in part on the occupant profile data.

* * * * *

UNITED STATES PATENT AND TRADEMARK OFFICE
CERTIFICATE OF CORRECTION

PATENT NO. : 11,127,373 B2
APPLICATION NO. : 16/668560
DATED : September 21, 2021
INVENTOR(S) : Jian Wan et al.

Page 1 of 1

It is certified that error appears in the above-identified patent and that said Letters Patent is hereby corrected as shown below:

On the Title Page

Item (72) The Inventor last name mistakenly reads "Prayat Anil Hedge" However, the Inventor last name should read as --Prayat Anil Hegde--.

Signed and Sealed this
Third Day of September, 2024

Katherine Kelly Vidal
*Director of the United States Patent and Trademark Office*